(12) United States Patent
Hosokawa et al.

(10) Patent No.: US 10,343,529 B2
(45) Date of Patent: Jul. 9, 2019

(54) HYBRID VEHICLE

(71) Applicant: TOYOTA JIDOSHA KABUSHIKI KAISHA, Toyota-shi, Aichi-ken (JP)

(72) Inventors: Yohei Hosokawa, Susono (JP);
Masakazu Tabata, Susono (JP);
Naruto Yamane, Susono (JP);
Tatsuhiro Hashida, Suntou-gun (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/841,631

(22) Filed: Dec. 14, 2017

(65) Prior Publication Data

US 2018/0222327 A1 Aug. 9, 2018

(30) Foreign Application Priority Data

Feb. 6, 2017 (JP) ................. 2017-019418

(51) Int. Cl.
*B60L 7/18* (2006.01)
*B60L 15/20* (2006.01)
*B60T 1/10* (2006.01)
*B60W 10/18* (2012.01)
*B60W 30/18* (2012.01)
(Continued)

(52) U.S. Cl.
CPC ............. *B60L 7/18* (2013.01); *B60L 15/2009* (2013.01); *B60T 1/10* (2013.01); *B60T 8/17* (2013.01); *B60W 10/18* (2013.01); *B60W 30/18127* (2013.01); *F02B 37/16* (2013.01); *F02B 39/10* (2013.01); *F02D 29/02* (2013.01); *F16D 61/00* (2013.01); *B60T 2270/60* (2013.01);
(Continued)

(58) Field of Classification Search
CPC ........ B60L 7/18; B60L 15/2009; B60T 10/10; B60W 10/18; B60W 30/18127; F01P 2025/08; F01P 2050/24; F02B 37/16; F02D 23/00; F16D 61/00
USPC ....................................... 180/65.21
See application file for complete search history.

(56) References Cited

U.S. PATENT DOCUMENTS 4,351,405 A * 9/1982 Fields ...................... B60K 1/00
180/65.225
5,637,987 A * 6/1997 Fattic ...................... B60K 6/365
322/40
(Continued)

FOREIGN PATENT DOCUMENTS

JP 05-098985 A 4/1993
JP 2004-225564 A 8/2004
(Continued)

*Primary Examiner* — James A Shriver, II
*Assistant Examiner* — Brian L Cassidy
(74) *Attorney, Agent, or Firm* — Sughrue Mion, PLLC

(57) ABSTRACT

The control apparatus closes the throttle, opens the bypass valve and supplies electric power to the electric compressor in a case where the remaining battery power of the battery is larger than the reference level when regenerative braking is performed with the first motor generator. The electric compressor is provided on the intake passage upstream of the throttle. The bypass valve is provided on the bypass passage that bypasses the electric compressor. According to the hybrid vehicle configured as above, regenerative braking force to be required can be obtained by performing electric power regeneration using the generator even when there is a constraint on regenerated electric power that the battery can accept.

5 Claims, 8 Drawing Sheets

(51) Int. Cl.
  *F02B 37/16*     (2006.01)
  *F16D 61/00*     (2006.01)
  *B60T 8/17*      (2006.01)
  *F02B 39/10*     (2006.01)
  *F02D 29/02*     (2006.01)
  *F02D 23/00*     (2006.01)

(52) U.S. Cl.
  CPC ....... *F01P 2025/08* (2013.01); *F01P 2050/24* (2013.01); *F02D 23/00* (2013.01); *Y02T 10/7258* (2013.01)

(56) References Cited

U.S. PATENT DOCUMENTS

| | | | |
|---|---|---|---|
| 6,938,420 B2* | 9/2005 | Kawamura | F02B 33/34 123/562 |
| 7,805,939 B2* | 10/2010 | Kimoto | F02B 33/44 60/609 |
| 2004/0194466 A1 | 10/2004 | Kawamura et al. | |
| 2004/0263099 A1* | 12/2004 | Maslov | B60L 11/126 318/400.24 |
| 2005/0255966 A1* | 11/2005 | Tao | B60K 6/445 477/27 |
| 2010/0152938 A1* | 6/2010 | Aoki | B60K 6/445 701/22 |
| 2013/0244829 A1* | 9/2013 | Nefcy | B60W 10/08 477/15 |
| 2015/0203106 A1* | 7/2015 | Zhao | B60L 7/18 701/22 |
| 2015/0360674 A1* | 12/2015 | Nefcy | B60W 30/19 477/20 |
| 2017/0259670 A1* | 9/2017 | Kuang | B60L 7/18 |
| 2017/0350315 A1* | 12/2017 | Kamio | H02P 3/14 |
| 2018/0022338 A1* | 1/2018 | Dalum | B60W 20/10 |
| 2018/0134276 A1* | 5/2018 | Zhao | B60W 20/14 |
| 2018/0141557 A1* | 5/2018 | Nefcy | B60W 10/08 |

FOREIGN PATENT DOCUMENTS

| | | |
|---|---|---|
| JP | 2004-251248 A | 9/2004 |
| JP | 2004-270602 A | 9/2004 |
| JP | 2005-61361 A | 3/2005 |
| JP | 2013-132920 A | 7/2013 |
| JP | 2016-107803 A | 6/2016 |

* cited by examiner

HYBRID VEHICLE

CROSS-REFERENCE TO RELATED APPLICATION

This application claims priority to Japanese Patent Application No. 2017-019418, filed on Feb. 6, 2017, which is incorporated by reference herein in its entirety.

BACKGROUND

Field

The present disclosure relates to a hybrid vehicle, and more particularly, to a hybrid vehicle performing regenerative braking using a generator.

Background Art

JP 2004-225564A discloses a hybrid vehicle that performs regenerative braking by use of a generator at the time of deceleration and charges a battery with regenerated electric power that is generated in a process to obtain regenerative braking force. When the battery is saturated, this hybrid vehicle suppresses electric power regeneration by the generator, and makes engine brake work by enlarging engine friction and pumping resistance. Thereby a change of braking force is avoided.

However, when the engine brake works, engine speed rises rapidly, which may make a driver feel uncomfortable. Thus, it is required to obtain regenerative braking force to be required by performing electric power regeneration using the generator, even when the battery is saturated and there is a constraint on regenerated electric power that the battery can accept.

Note that, in addition to the above described patent literature, JP 2013-132920A, JP 5-98985A, JP 2016-107803, and JP 2004-251248A may be mentioned as examples of literature describing the state-of-the-art at the time of filing the present application.

SUMMARY

The present disclosure is made in the light of the problem as described above, and has an object to provide a hybrid vehicle that can obtain regenerative braking force to be required by performing electric power regeneration using a generator even when there is a constraint on regenerated electric power that a battery can accept.

A hybrid vehicle according to the present disclosure comprises an internal combustion engine, a throttle, an electric compressor, a bypass passage, a bypass valve, a generator, and a battery. The internal combustion engine is coupled to a wheel via a power transmission system. The throttle is provided on an intake passage of the internal combustion engine. The electric compressor is provided on the intake passage upstream of the throttle. The bypass passage is provided in parallel with the electric compressor to bypass the electric compressor. The bypass valve is provided on the bypass passage. The generator is coupled to the wheel via the power transmission system and is designed to be capable of inputting regenerative braking force obtained by electric power regeneration to the power transmission system. The battery stores electric power regenerated by the generator.

The hybrid vehicle according to the present disclosure further comprises a control apparatus. The control apparatus operates the throttle and the bypass valve and controls energization to the electric compressor. The electric compressor may be supplied electric power to from the battery, or may be supplied regenerated electric power obtained by electric power regeneration by the generator to. The battery supplying electric power to the electric compressor may be the same battery as the battery storing regenerated electric power, or may be another battery. The regenerated electric power that is regenerated by the generator may be supplied to the electric compressor. The control apparatus closes the throttle, opens the bypass valve and supplies electric power to the electric compressor in a case where remaining battery power is larger than a reference level when regenerative braking is performed with the generator. The reference level of the remaining battery power may be determined based on the regenerated electric power that the battery can accept, for example.

As described above, the hybrid vehicle according to the present disclosure comprises the electric compressor supercharging air inhaled into the internal combustion engine. According to the electric compressor, supercharging can be performed with arbitrary supercharging pressure and can be performed at an arbitrary timing, by controlling electric power supply from the battery. Furthermore, the electric compressor can be also used for intentional electric power consumption other than the supercharging that is the original application. However, if the electric compressor is merely operated, unnecessary air is sent into the internal combustion engine and affects post treatment processes such as catalysts, and the like. Also, closing the throttle not to send air into the internal combustion engine affects controllability of the air flow rate at the time of the restart of the internal combustion engine because air pressure in the upstream side of the throttle rises by supercharging. In this regard, the hybrid vehicle according to the present disclosure can make the electric compressor operate in the condition where the throttle is closed and the bypass valve is opened. According to this, unnecessary air is not sent into the internal combustion engine, and an excessive rise in air pressure is avoided because the air sent off by the electric compressor only circulates between the electric compressor and the bypass passage.

When the remaining battery power is larger than the reference level, it is not recommended to charge the battery by using the regenerated electric power obtained by the generator. Therefore, when the electric power regeneration is performed by the generator, it is necessary to consume the electric power regenerated by the generator or the regenerated electric power more than the chargeable electric power of the battery by using some kind of methods. According to the hybrid vehicle according to the present disclosure, it is possible to consume the electric power regenerated by the generator or the regenerated electric power more than the chargeable electric power of the battery while suppressing a rise in air pressure by closing the throttle, opening the bypass valve and supplying electric power to the electric compressor. Thus, the hybrid vehicle according to the present disclosure can obtain regenerative braking force to be required by performing electric power regeneration using the generator even when there is a constraint on regenerated electric power that the battery can accept.

when an inlet temperature of the electric compressor is higher than a reference temperature, the control apparatus may make an opening of the bypass valve small in comparison with a case where the inlet temperature is equal to or lower than the reference temperature. When the opening of the bypass valve is made small, the air pressure slightly rises, but the air temperature decreases with expansion of the air passing through the bypass valve. Thereby, the inlet temperature of the electric compressor decreases.

Also, the hybrid vehicle may further comprise a cooling apparatus that cools air circulating between the electric compressor and the bypass passage. For example, the cooling apparatus may be provided on the bypass passage downstream of the bypass valve in an air circulation direction or may be provided on the intake passage upstream of the electric compressor. Also, the cooling apparatus may be integrated with a housing of the electric compressor. According to the hybrid vehicle that is provided with the cooling apparatus, a rise in temperature of the air that circulates between the electric compressor and the bypass passage is suppressed.

As described above, according to the hybrid vehicle according to the present disclosure, braking force to be required can be obtained by performing electric power regeneration using the generator even when there is a constraint on the regenerated electric power that the battery can accept.

DETAILED DESCRIPTION

Hereunder, an embodiment of the present disclosure will be described with reference to the drawings. Note that when the numerals of numbers, quantities, amounts, ranges and the like of respective elements are mentioned in the embodiment shown as follows, the present disclosure is not limited to the mentioned numerals unless specially explicitly described otherwise, or unless the disclosure is explicitly specified by the numerals theoretically. Further, structures that are described in the embodiment shown as follows are not always indispensable to the disclosure unless specially explicitly shown otherwise, or unless the disclosure is explicitly specified by the structures theoretically.

First Embodiment

Figure 1:
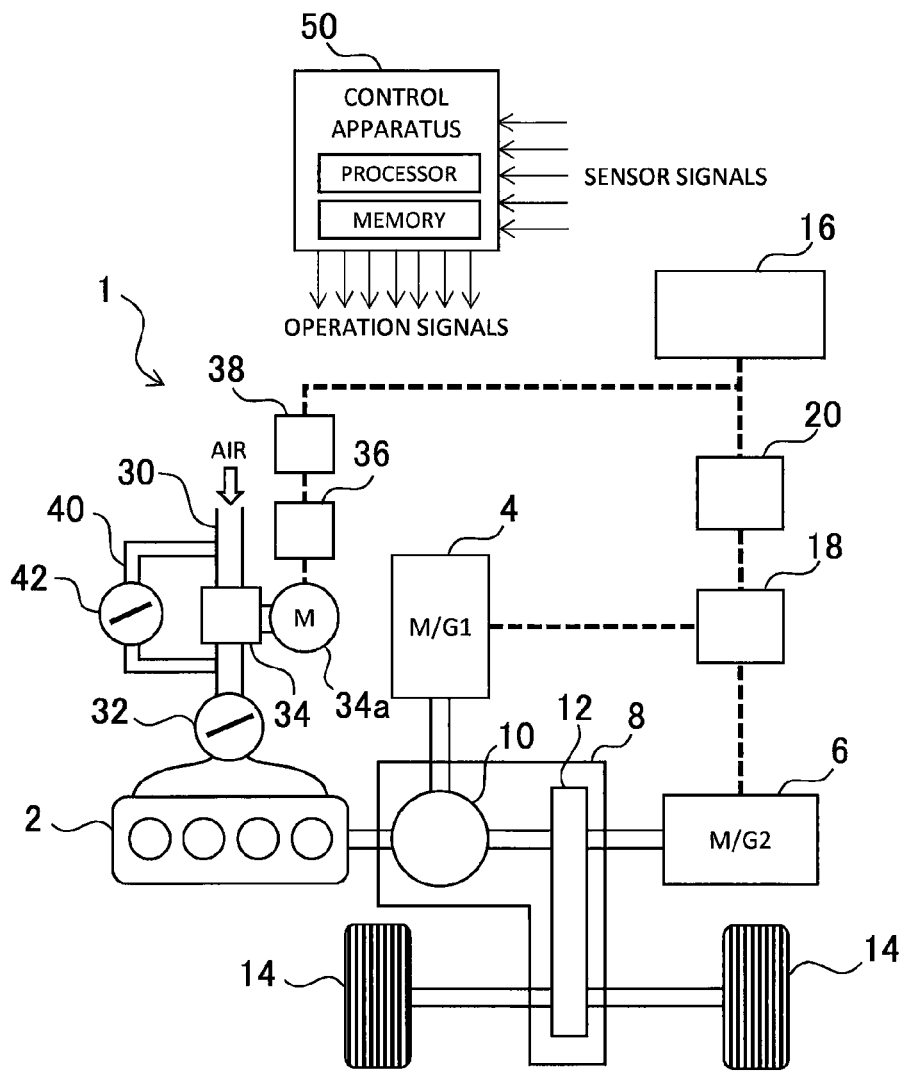
FIG. 1 is a view illustrating a configuration of a hybrid vehicle according to a first embodiment.

FIG. 1 is a view illustrating a configuration of a hybrid vehicle according to a first embodiment. As shown in FIG. 1, the hybrid vehicle 1 comprises an engine 2 as one power apparatus to drive wheels 14. The engine 2 is an internal combustion engine outputting power by combustion of hydrocarbon-based fuel such as gasoline, light diesel oil, and the like. The engine 2 comprises an intake system, an exhaust system, a fuel injection system, an ignition system, a cooling system, and the like. A throttle 32 to adjust an intake air amount is provided on an air intake passage 30 constituting the intake system. An electric compressor 34 driven by a motor 34a is provided upstream of the throttle valve 32 on the air intake passage 30. A bypass passage 40 to bypass the electric compressor 34 is formed on the intake passage 30 in parallel with the electric compressor 34. A bypass valve 42 to adjust an amount of air flowing in the bypass passage 40 is provided on the bypass passage 40.

The hybrid vehicle 1 comprises a first motor generator 4 and a second motor generator 6 that are power-generatable motors as the other power apparatus to drive the wheels 14. The first motor generator 4 and the second motor generator 6 are alternating current synchronous type generator motors that have a function as a motor converting supplied electric power into torque and a function as a generator converting input mechanical power into electric power. The first motor generator 4 is operated as a generator mainly. The second motor generator 6 is operated as a motor mainly.

The engine 2, the first motor generator 4 and the second motor generator 6 are coupled to the wheels 14 via a power transmission system 8. The power transmission system 8 comprises a power distribution mechanism 10 and a reduction mechanism 12. For example, the power distribution mechanism 10 is a planetary gear unit. The power distribution mechanism 10 divides torque outputted by the engine 2 into the first motor generator 4 and the wheels 14. The torque outputted by the engine 2 or the torque outputted by the second motor generator 6 is transmitted to the wheels 14 through the reduction mechanism 12.

The first motor generator 4 regenerates electric power by using the torque supplied through the power distribution mechanism 10. When electric power regeneration is performed by the first motor generator 4 in the condition where torque is not outputted by the engine 2 and the second motor generator 6, regenerative braking force is transmitted to the wheels 14 through the power transmission system 8, and the hybrid vehicle 1 slows down. That is, the hybrid vehicle 1 can perform regenerative braking by use of the first motor generator 4.

The first motor generator 4 and the second motor generator 6 transmit and receive electric power to/from a battery 16 through an inverter 18 and a converter 20. The inverter 18 is designed to make any one of the first motor generator 4 and the second motor generator 6 consume electric power generated by the other of them. The inverter 18 converts electric power stored in the battery 16 into alternating current from direct current and supplies it to the second motor generator 6. Also, the inverter 18 converts electric power generated by the first motor generator 4 into direct current from alternating current and charges it into the battery 16. Therefore, the battery 16 is charged and discharged with extra/deficient electric power of the first motor generator 4 and the second motor generator 6.

The motor 34a of the electric compressor 34 is a three-phase AC motor. The motor 34a is supplied electric power to from the battery 16 through a converter 38 and an inverter 36. The converter 38 adjusts voltage. The inverter 36 converts DC power into AC power and supplies AC power to the motor 34a. Also, the motor 34a can be supplied electric power to from the first motor generator 4 and the second motor generator 6 through the inverter 18, the converter 20, the converter 38 and the inverter 36. For example, when the regenerative braking is performed by the first motor generator 4, part or all of electric power regenerated by the first motor generator 4 can be supplied to the motor 34a.

The hybrid vehicle 1 comprises a control apparatus 50 that controls operation of the hybrid vehicle 1 by controlling operation of the engine 2, the first motor generator 4, the second motor generator 6, the power distribution mechanism 10, and the like. The control apparatus 50 is an ECU (Electronic Control Unit) having at least one processor and at least one memory. Various programs and various data including maps for controlling operation of the hybrid vehicle 1 are stored in the memory. When programs stored in the memory are executed by the processor, various functions are implemented to the control apparatus 50. Note that the control apparatus 50 may consists of a plurality of ECUs.

The control device 50 performs control of the engine 2 including intake air amount control, fuel injection control, ignition timing control, and boost control. Also, the control device 50 performs regenerative control to operate the first motor generator 4 or the second motor generator 6 as a generator and power-run control to operate the first motor generator 4 or the second motor generator 6 as a motor. Specifically, the control to the first motor generator 4 and the second motor generator 6 is performed via the inverter 18. Also, the control device 50 acquires information such as the voltage of the battery 16 and watches SOC (State of Charge) of the battery 16.

Figure 2:
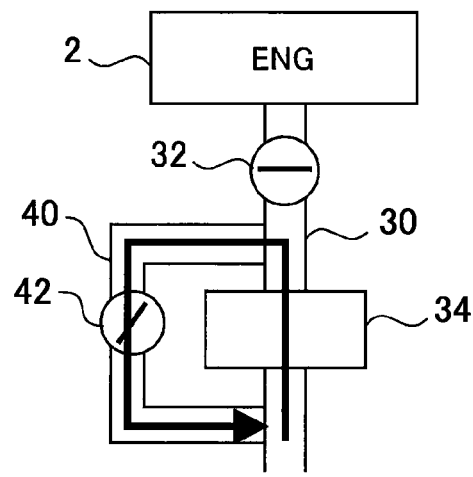
FIG. 2 is a view illustrating settings of an opening of a throttle and an opening of a bypass valve according to an electric power consumption control and a flow of air created by the settings.

Furthermore, the control of the hybrid vehicle 1 performed by the control apparatus 50 includes electric power consumption control that makes the electric compressor 34 consume electric power intentionally. The electric power consumption control includes operation of the throttle 32 and operation of the bypass valve 42. FIG. 2 is a view illustrating settings of the opening of the throttle 32 and the opening of the bypass valve 42 according to the electric power consumption control and a flow of air created by the settings. In the electric power consumption control, the throttle 32 is closed, and the bypass valve 42 is opened. When electric power is supplied to the electric compressor 34 and the electric compressor 34 is operated in this state, the air sent off by the electric compressor 34 circulates between the electric compressor 34 and the bypass passage 40.

Figure 3:
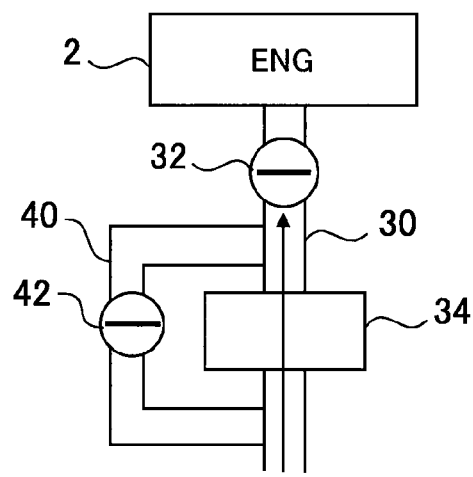
FIG. 3 is a view illustrating settings of an opening of a throttle and an opening of a bypass valve according to a comparative example and a flow of air created by the settings.

Here, one comparative example is given to clarify an effect of the electric power consumption control. FIG. 3 is a view illustrating settings of the opening of the throttle 32 and the opening of the bypass valve 42 according to the comparative example and a flow of air created by the settings. In the comparative example, both the throttle 32 and the bypass valve 42 are closed. When electric power is supplied to the electric compressor 34 and the electric compressor 34 is operated in this state, an outlet pressure of the electric compressor 34 rises because air is compressed by the electric compressor 34.

Figure 4:
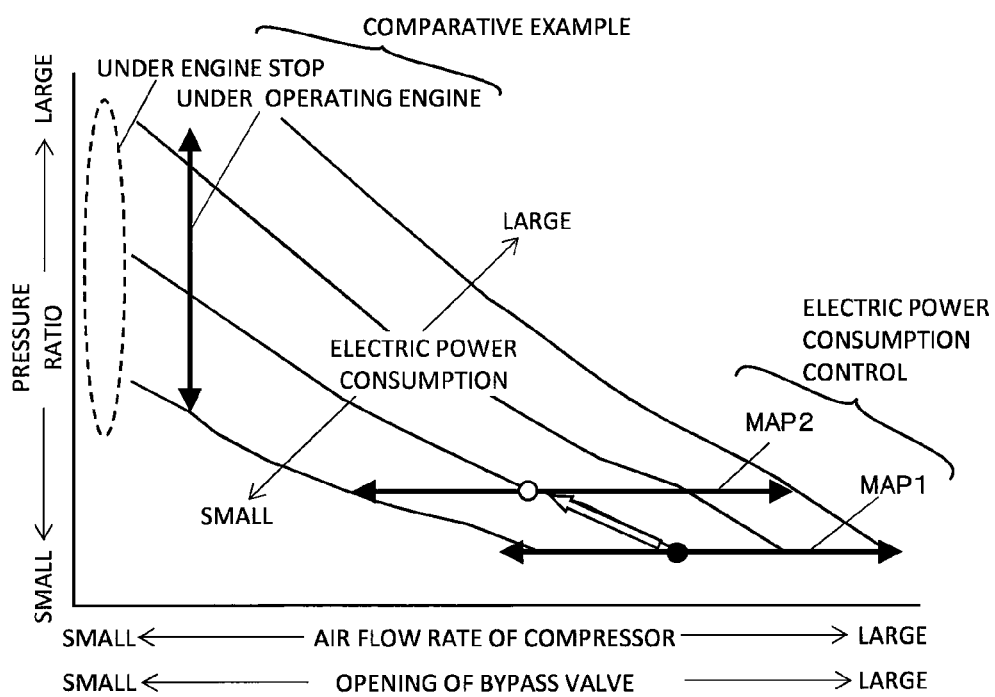
FIG. 4 is a view illustrating a relation between electric power consumption, an air flow rate and a pressure ratio in an electric compressor.

The electric power consumption of the electric compressor 34 relates to a pressure ratio of an outlet pressure to an inlet pressure of the electric compressor 34 and an air flow rate of the electric compressor 34. FIG. 4 is a view illustrating a relation between the electric power consumption, the air flow rate and the pressure ratio in the electric compressor 34. When the electric power consumption is constant, the pressure ratio decreases as the air flow rate increases. When the air flow rate is constant, the pressure ratio increases as the electric power consumption increases. When the pressure ratio is constant, the air flow rate increases as the electric power consumption increases.

In the comparative example, when the engine 2 is stopped, the air sent off by the electric compressor 34 loses its way. Therefore, the airflow into the electric compressor 34 disappears in a certain timing and surging occurs. Because the electric compressor 34 hardly works in a surging region, it is hard to make the electric compressor 34 consume electric power. On the other hand, when the engine 2 is rotating, for example, at the time of deceleration by use of engine brake, a flow of the air passing through the throttle 32 occurs. However, the air flow rate is very small and does not greatly increase, so the pressure ratio rises with increase in the electric power consumption of the electric compressor 34. An excessive rise in the pressure ratio of the electric compressor 34 should be avoided because it adversely affects controllability of the air flow rate at the time of the restart of the engine 2.

On the other hand, according to the electric power consumption control performed in the present embodiment, the air sent off by the electric compressor 34 circulates between the electric compressor 34 and the bypass passage 40. Thus, surging does not occur in the electric compressor 34, and the excessive rise in the pressure ratio of the electric compressor 34 is also avoided. Also, the flow rate of the circulating air can be adjusted by the opening of the bypass valve 42. Thus, by changing the opening of the bypass valve 42 depending on the electric power consumption of the electric compressor 34, the air flow rate can be adjusted so that the pressure ratio is kept constant.

In the electric power consumption control performed in the present embodiment mode, two maps that set relations between the opening of the bypass valve 42 and the electric power consumption of the electric compressor 34 are used. A first map (MAP1) sets a first relation between the opening of the bypass valve 42 and the electric power consumption. The first relation can keep the pressure ratio low. A second map (MAP2) sets a second relation between the opening of the bypass valve 42 and the electric power consumption. The second relation can reduce the air flow rate relatively though allows the pressure ratio to become slightly larger than the first map. These maps are stored in a memory of the control apparatus 50.

Figure 5:
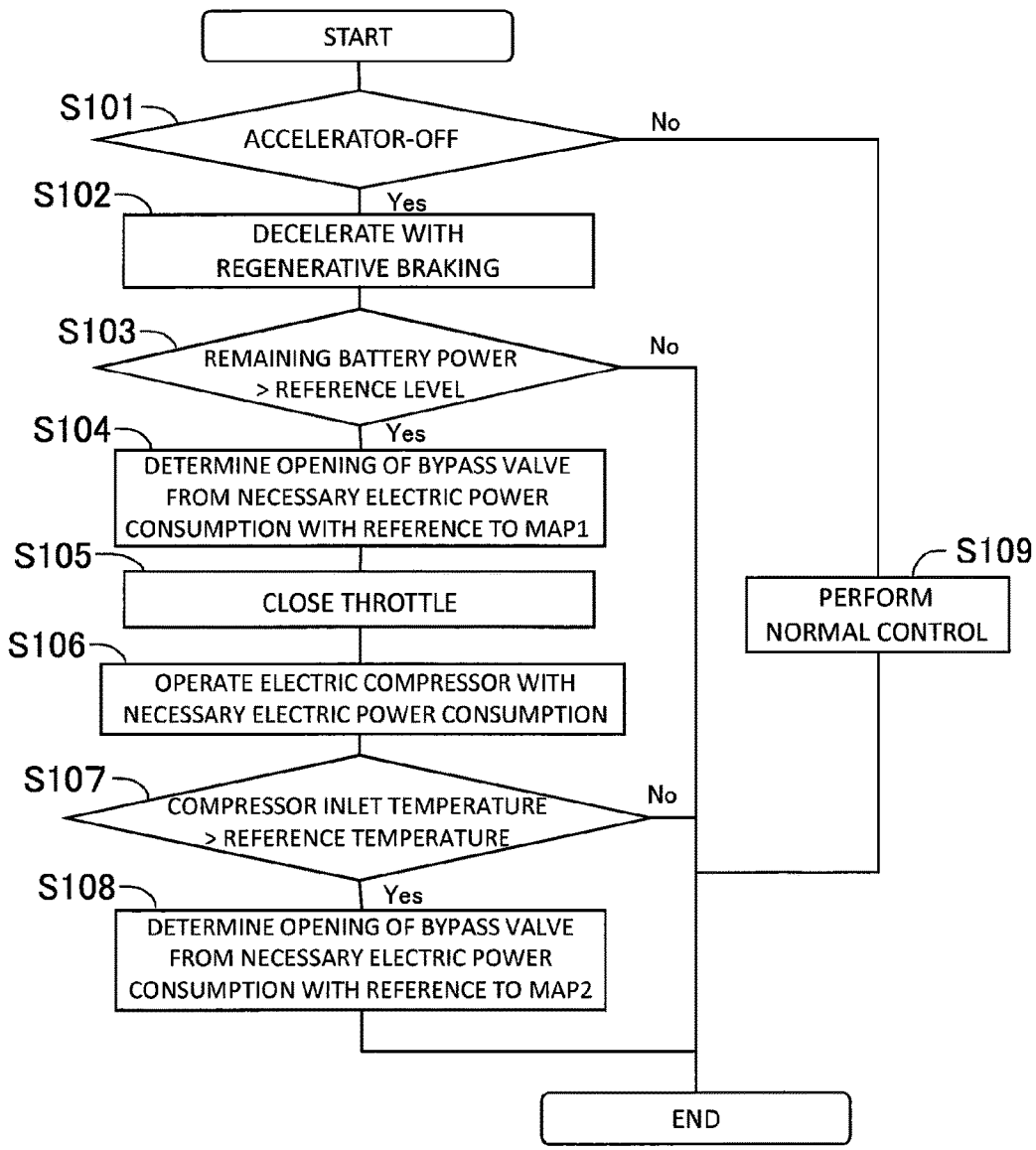
FIG. 5 is a flowchart illustrating procedure of braking control that is performed in the first embodiment.

For example, when regenerative braking is performed by the first motor generator 4, the control apparatus 50 performs the electric power consumption control if the battery cannot accept all of the regenerated electric power. Determination of whether regenerative braking is performed and determination of whether the electric power consumption control is performed are conducted in the braking control performed by the control apparatus 50. FIG. 5 is a flowchart illustrating procedure of the braking control performed by the control apparatus 50. The processor of the control apparatus 50 executes a program represented by this flowchart with a scheduled period. Hereinafter, contents of the braking control will be described along the flowchart.

First, in step S101, it is confirmed whether or not the hybrid vehicle 1 is in a condition of accelerator-off. The accelerator-off is a condition where an accelerator pedal is opened, and is detected by a switch. When the accelerator pedal is stepped on, the regenerative braking is not performed because the hybrid vehicle 1 is during acceleration or steady travel. In this case, processing of step S109 is performed. In step S109, normal control to control a power unit of the hybrid vehicle 1 in accordance with an opening of the accelerator pedal is performed.

When the accelerator pedal is opened, the hybrid vehicle 1 performs coasting travel. In this case, processing of step S102 is performed. In step S102, regenerative braking by the first motor generator 4 is performed to decelerate the hybrid vehicle 1.

Then, determination of step S103 is performed. In step S103, it is determined whether remaining power of the battery 16 is larger than a reference level. For example, the remaining battery power is SOC. When the regenerative braking by the first motor generator 4 is performed, regenerated electric power is obtained by power generation. If the remaining battery power is small, the battery 16 can accept the regenerated electric power. However, when the remaining battery power is large, the battery 16 does not have a margin to accept the regenerated electric power. The reference level used for the determination is set based on available capacity necessary to accept the regenerated electric power that is generated in the regenerative braking.

When the determination result of step S103 is negative, that is, when the battery 16 has available capacity to accept the regenerated electric power, all the subsequent processing are skipped and the routine terminates. In this case, the above-mentioned electric power consumption control is not performed.

When the determination result of step S103 is affirmative, that is, when the battery 16 does not have available capacity to accept the regenerated electric power, processing of step S104, S105 and S106 is performed. In step S104, the opening of the bypass valve 42 is determined from necessary electric power consumption with reference to the above-mentioned first map (See MAP1 shown in FIG. 4). The necessary electric power consumption is the electric power that is made to be consumed by the electric compressor 34 among the regenerated electric power obtained in the regenerative braking by the first motor generator 4. The necessary electric power consumption is determined based on the regenerated electric power and chargeable electric power of the battery 16. The chargeable electric power may be calculated based on parameters of the battery 16 like SOC, a current value, a voltage value, and a temperature. The control apparatus 50 opens the bypass valve 42 to the opening determined in step S104.

In step S105, the throttle 32 is closed. This operation forms a circulation route where air circulates between the electric compressor 34 and the bypass passage 40. Note that the closing operation of the throttle 32 may be performed simultaneously with the opening operation of the bypass valve 42, or may be performed prior to the opening operation of the bypass valve 42.

In step S106, it is performed to operate the electric compressor 34 with the necessary electric power consumption. This operation makes the electric compressor 34 take air in. The taken air circulates between the electric compressor 34 and the bypass passage 40 (See FIG. 2). At this time, when air passes through the electric compressor 34, the pressure of the air rises. However, because the opening of the bypass valve 42 is determined using the first map, the rise in the air pressure is controlled low without depending on the electric power consumption. That is, processing of step S104, S105 and S106 makes it possible to consume electric power while controlling the rise in the air pressure low.

Now, when the electric compressor 34 is used in succession, the temperature of the air circulating between the electric compressor 34 and the bypass passage 40 gradually rises by the heat that the electric compressor 34 generates. Because the rise in the air temperature causes an outbreak of knocking when restarting the engine 2, it should be avoided to raise the air temperature excessively.

Thus, determination of step S107 is performed. In step S107, it is determined whether the inlet temperature of the electric compressor 34 is larger than a reference temperature. The inlet temperature of the electric compressor 34 is measured by a temperature sensor (not illustrated) attached to the air intake passage 30. The reference temperature is set to the temperature that can avoid the outbreak of the knocking when restarting the engine 2 in consideration of the influence that the air temperature gives on combustion. Specifically, the determination of the reference temperature that is preferred is made by adaptation work using an actual machine.

When the determination result of step S107 is negative, that is, when the air temperature has not risen to a degree that cannot be overlooked, all the subsequent processing are skipped and the routine terminates.

When the determination result of step S107 is affirmative, that is, when the air temperature has risen to a degree that may generate the knocking when restarting the engine 2, processing of step S108 is performed. In step S108, the opening of the bypass valve 42 is determined from the necessary electric power consumption with reference to the above-mentioned second map (See MAP2 shown in FIG. 4). By switching from the first map to the second map, the operating point of the electric compressor 34 defined with the pressure ratio and the air flow rate moves to the side raising compressor efficiency on an equal electric power consumption line. Thereby, the opening of the bypass valve 42 is reduced to decrease the air flow rate. When the opening of the bypass valve 42 is reduced, the pressure ratio will rise. The air temperature upstream of the bypass valve 42 is approximately constant regardless of the pressure ratio if the electric power consumption is constant. However, the larger the pressure ratio is, the more the air temperature decreases with expansion of the air passing through the bypass valve 42. Therefore, by reducing the opening of the bypass valve 42 to increase the pressure ratio, the temperature of the air passing through the bypass valve 42, that is, the inlet temperature of the electric compressor 34 can be decreased.

As described above, according to the hybrid vehicle according to the present embodiment, when there is a constraint on the regenerated electric power that the battery 16 can accept, a circulation route of the air is formed and the electric power consumption control operating the electric compressor 34 is performed. Thereby, necessary braking force can be obtained in the regenerative braking by the first motor generator 4, without depending on the engine brake.

Second Embodiment

Figure 6:
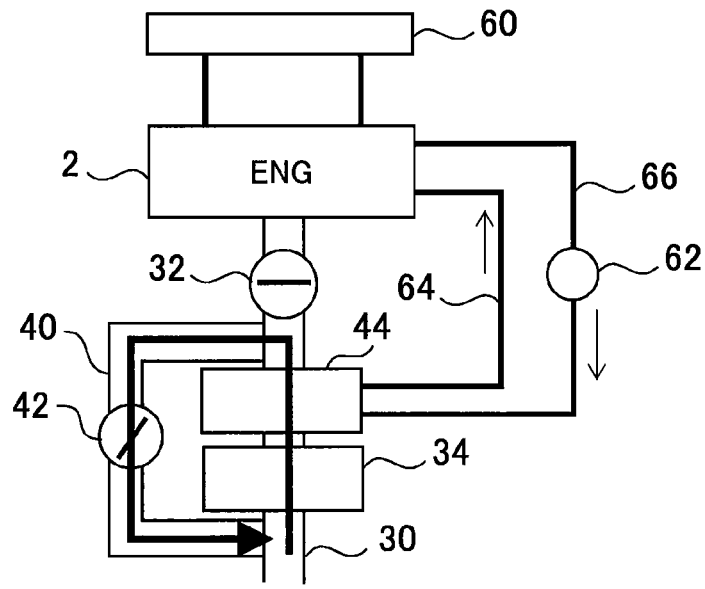
FIG. 6 is a view illustrating a configuration of a main part of a hybrid vehicle according to a second embodiment and a flow of air and a flow of cooling water created by the configuration.

Next, a second embodiment of the present disclosure will be described. FIG. 6 is a view illustrating a configuration of a main part of a hybrid vehicle according to the second embodiment. Also, FIG. 6 shows a flow of air and a flow of cooling water created by the configuration. The hybrid vehicle according to the present embodiment comprises a cooling apparatus 44 that cools the air that passed through the electric compressor 34. The cooling apparatus 44 is a water-cooled intercooler. The cooling apparatus 44 has a role to suppress a rise in the temperature of the air circulating between the electric compressor 34 and the bypass passage 40. In the example shown in FIG. 6, the cooling apparatus 44 is provided on the air intake passage 30 downstream of the electric compressor 34 and upstream of a branch point of the bypass passage 40.

The cooling apparatus 44 is connected to the engine 2 with cooling water passages 64, 66. The cooling water passages 64, 66 form a circulation route circulating cooling water between the cooling apparatus 44 and the engine 2. This circulation route includes a radiator 60. An electric pump 62 to circulate cooling water is provided on the cooling water passage 66. When the electric pump 62 operates, the temperature of the cooling water in the cooling apparatus 44 increases by heat exchange with air. When this heated cooling water is supplied to the engine 2 in a cold condition, a warm-up of the engine 2 can be promoted.

Figure 7:
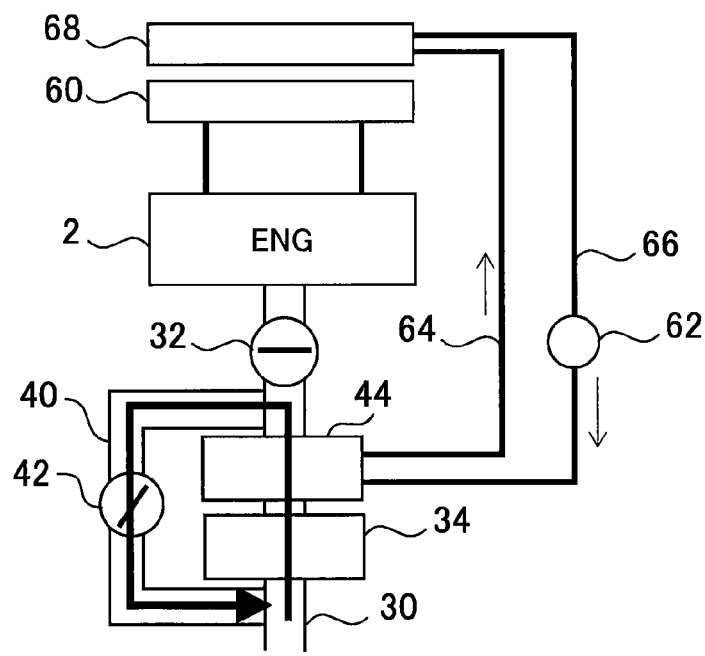
FIG. 7 is a view illustrating a configuration of a main part of a first modification of the hybrid vehicle according to the second embodiment and a flow of air and a flow of cooling water created by the configuration.

Note that the circulation route of cooling water may be modified, for example, as shown in FIG. 7. FIG. 7 is a view illustrating a configuration of a main part of a first modification of the hybrid vehicle according to the present embodiment. Also, FIG. 7 shows a flow of air and a flow of cooling water created by the configuration. In the first modification, the cooling apparatus 44 is connected to a radiator 68 provided in front of the radiator 60 with the cooling water passages 64, 66. When supplying to the radiator 68 the cooling water warmed by heat exchange with air in the cooling apparatus 44, the cooling water in the radiator 60 is heated by heat radiation from the radiator 68, and a warm-up of the engine 2 is promoted indirectly.

Figure 8:
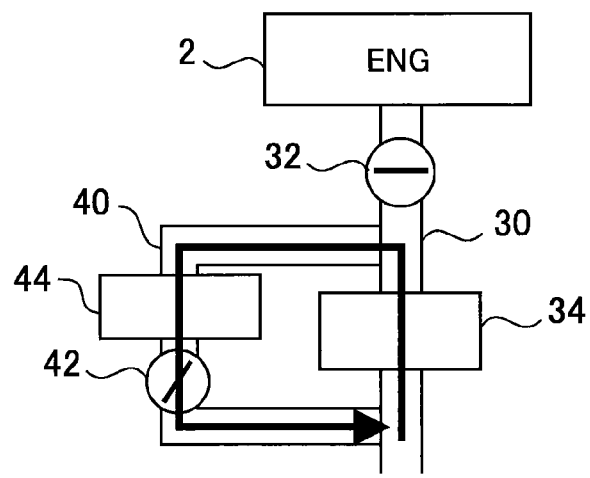
FIG. 8 is a view illustrating a configuration of a main part of a second modification of the hybrid vehicle according to the second embodiment and a flow of air created by the configuration.
Figure 9:
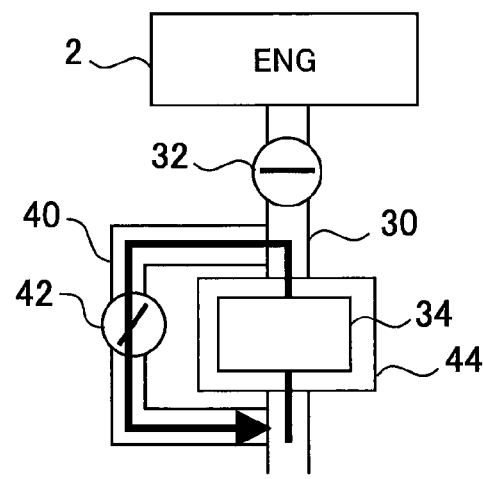
FIG. 9 is a view illustrating a configuration of a main part of a third modification of the hybrid vehicle according to the second embodiment and a flow of air created by the configuration.

Also, the installation position of the cooling apparatus 44 may be modified, for example, as shown in FIG. 8 or FIG. 9. FIG. 8 is a view illustrating a configuration of a main part of a second modification of the hybrid vehicle according to the present embodiment and a flow of air created by the configuration. FIG. 9 is a view illustrating a configuration of a main part of a third modification of the hybrid vehicle according to the present embodiment and a flow of air created by the configuration. In the second modification shown in FIG. 8, the cooling apparatus 44 is provided on the bypass passage 40. Specifically, the cooling apparatus 44 is provided upstream of the bypass valve 42 in an air circulation direction. In the third modification shown in FIG. 9, the cooling apparatus 44 is integrated with the electric compressor 34. Specifically, a housing of the electric compressor 34 is constructed of the cooling apparatus 44.

Figure 10:
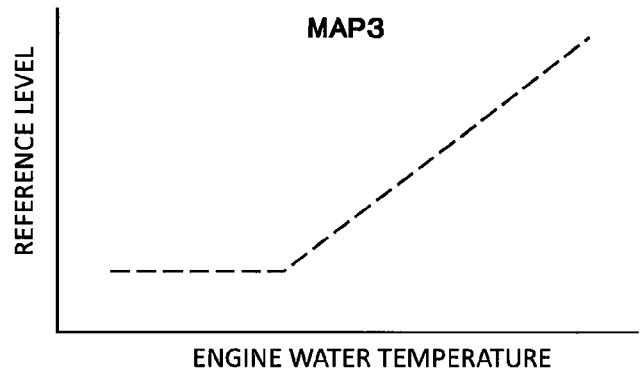
FIG. 10 is a view illustrating an image of a map (MAP3) for determining a reference level of remaining battery power based on an engine water temperature.

In the present embodiment, the reference level of the remaining battery power is determined from an engine water temperature. FIG. 10 is a view illustrating an image of a third map (MAP3) for determining the reference level of the remaining battery power based on the engine water temperature. In this map, when the engine water temperature is low, the reference level is set to a low level. Because the electric power consumption control is performed when the remaining battery power is larger than the reference level, the probability that the electric power consumption control is performed becomes higher when the reference level becomes low. When the electric power consumption control is performed, air is warmed by the electric compressor 34, and cooling water is warmed by heat exchange with the air in the cooling apparatus 44. Thus, according to the setting of the reference level shown in FIG. 10, the engine 2 in a cold condition is warmed up by the heat generated in the electric compressor 34. Also, the electric power consumption control is restrained from being performed idly because the reference level is changed to a larger level when the engine water temperature increases.

Figure 11:
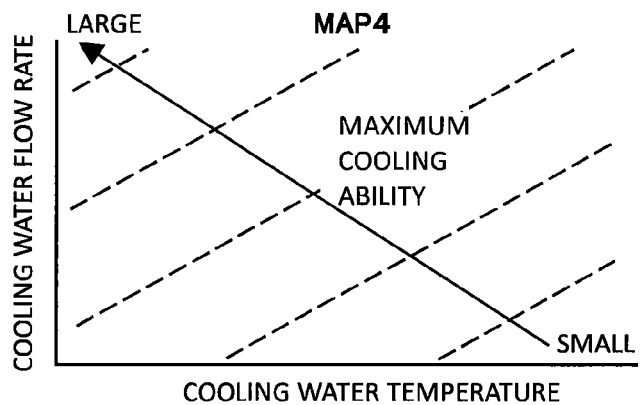
FIG. 11 is a view illustrating an image of a map (MAP4) for calculating maximum cooling quantity of a cooling apparatus based on a cooling water temperature and a cooling water flow rate.
Figure 12:
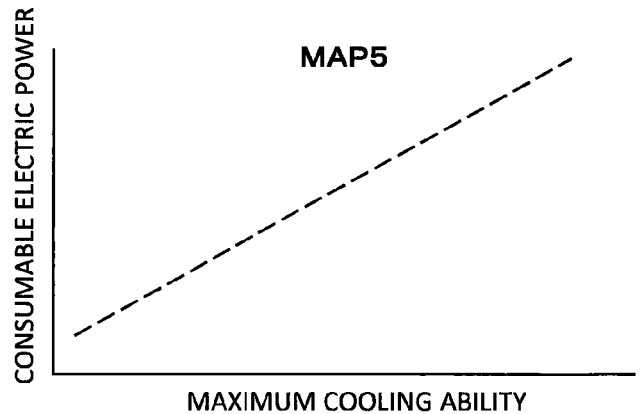
FIG. 12 is a view illustrating an image of a map (MAP5) for calculating consumable electric power of the electric compressor based on the maximum cooling ability of the cooling apparatus.

In the present embodiment, consumable electric power, which is electric power that the electric compressor 34 can consume, is calculated from coolability of the cooling apparatus 44. The consumable electric power is an upper limit of the electric power consumption not to raise the temperature of the air circulating between the electric compressor 34 and the bypass passage 40 up to a fixed temperature. For this calculation, two maps are prepared in the memory of the control apparatus 50. FIG. 11 is a view illustrating an image of a fourth map (MAP4) which is one map of the above two maps. In the fourth map, maximum cooling ability of the cooling apparatus 44 is related with a cooling water temperature and a cooling water flow rate. According to this map, the maximum cooling ability of the cooling apparatus 44 increases as the cooling water temperature becomes low, and the maximum cooling ability of the cooling apparatus 44 also increases as the cooling water flow rate becomes large. FIG. 12 is a view illustrating an image of a fifth map (MAP5) which is the other map of the above two maps. In the fifth map, the consumable electric power of the electric compressor 34 is related with the maximum cooling ability of the cooling apparatus 44. According to this map, the consumable electric power of the electric compressor 34 also increases as the maximum cooling ability of the cooling apparatus 44 becomes large.

Figure 13:
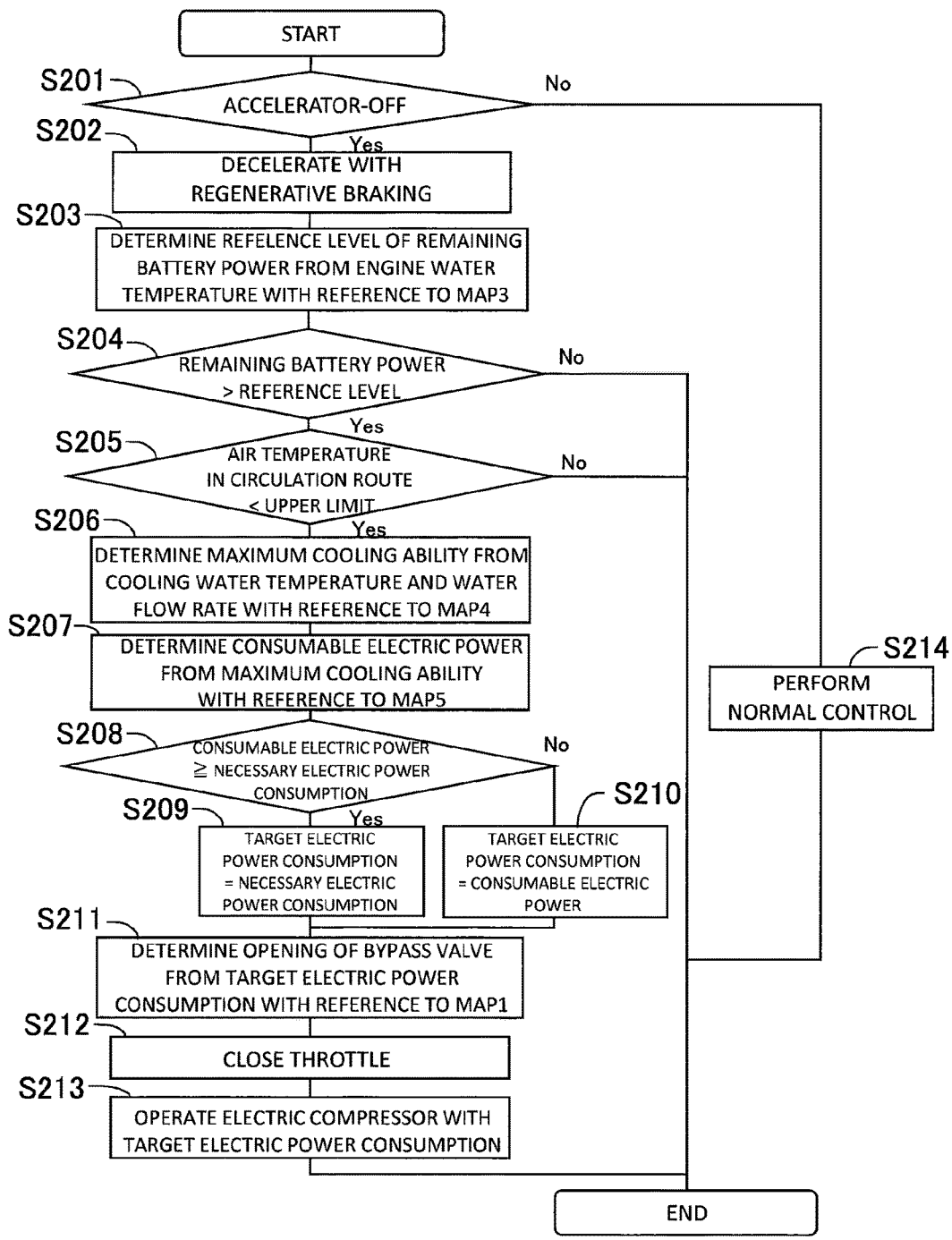
FIG. 13 is a flowchart illustrating procedure of braking control that is performed in the second embodiment.

The above described setting method of the reference level of the remaining battery power and the above described calculation method of the consumable electric power of the electric compressor 34 are used in the braking control performed by the control apparatus 50. FIG. 13 is a flowchart illustrating procedure of the braking control that is performed by the control apparatus 50 in the present embodiment. The processor of the control apparatus 50 executes a program represented by this flowchart with a scheduled period. Hereinafter, contents of the braking control will be described along the flowchart.

First, in step S201, it is confirmed whether or not the hybrid vehicle 1 is in a condition of accelerator-off. When the confirmation result of step S201 is negative, processing of step S214 is performed. In step S214, normal control to control a power unit of the hybrid vehicle 1 in accordance with an opening of the accelerator pedal is performed.

When the confirmation result of step S201 is affirmative, processing of step S202 is performed. In step S202, regenerative braking by the first motor generator 4 is performed to decelerate the hybrid vehicle 1.

Then, in step S203, the reference level of the remaining battery power is determined from an engine water temperature with reference to the above-mentioned third map (See FIG. 10). The engine water temperature is measured by a water temperature sensor (not illustrated) attached to the engine 2. In step S204, it is determined whether or not the remaining battery power is larger than the reference level.

When the determination result of step S204 is negative, all the subsequent processing is skipped, and the routine terminates. In this case, the electric power consumption control that operates the electric compressor 34 to consume electric power is not performed.

When the determination result of step S204 is affirmative, processing of step S205 is performed. In step S205, it is determined whether or not an air temperature in the circulation route formed between the electric compressor 34 and the bypass passage 40 exceeds an upper limit temperature. The air temperature in the circulation route is measured by a temperature sensor (not illustrated) attached to somewhere of the circulation route. Note that the upper limit temperature is an upper limit of a temperature range where reliability of engine components can be secured or an upper limit of a temperature range where an outbreak of knocking can be avoided when restarting the engine 2.

When the determination result of step S205 is negative, all the subsequent processing is skipped, and the routine terminates. In this case, the electric power consumption control that operates the electric compressor 34 to consume electric power is not performed.

When the determination result of step S205 is affirmative, processing of step S206 and S207 is performed. In step S206, maximum cooling ability is calculated from a cooling water temperature and a cooling water flow rate with reference to the above-mentioned fourth map (See FIG. 11). The engine water temperature is measured by a water temperature sensor (not illustrated) attached to the engine 2. In step S204, it is determined whether or not the remaining battery power is larger than the reference level. Note that the cooling water temperature and the cooling water flow rate are measured by a temperature sensor (not illustrated) and a flow sensor (not illustrated) that are provided on the circulation route of the cooling water. In step S207, the consumable electric power of the electric compressor 34 is calculated from the maximum cooling ability with reference to the above-mentioned fifth map (See FIG. 12).

Then, processing of step S208 is performed. In step S208, the consumable electric power calculated in step S207 is compared with the necessary electric power consumption. When the consumable electric power is equal to or larger than the necessary electric power consumption, the routine advances to step S209. In step S209, the necessary electric power consumption is set as a target electric power consumption of the electric compressor 34. When the consumable electric power is smaller than the necessary electric power consumption, the routine advances to step S210. In step S210, the consumable electric power is set as the target electric power consumption of electric compressor 34.

After setting of the target electric power consumption was accomplished in step S209 or step S210, processing of step S211, step S212 and S213 is performed. In step S211, the opening of the bypass valve 42 is determined from the target electric power consumption with reference to the above-mentioned first map (See MAP1 shown in FIG. 4). The control apparatus 50 opens the bypass valve 42 to the opening determined in step S211. In step S212, the throttle 32 is closed. The circulation route where air circulates between the electric compressor 34 and the bypass passage 40 is formed by this operation. In step S213, it is performed to operate the electric compressor 34 with the target electric power consumption. According to this operation, air is taken in by the electric compressor 34, and the taken air circulates between the electric compressor 34 and the bypass passage 40.

As described above, according to the braking control performed in the present embodiment, the electric power consumption necessary to the regenerative braking can be performed by the electric compressor 34 while an excessive rise in temperature of the air that is circulated by the electric compressor 34 is restrained. Note that necessary braking force may not be obtained only with the regenerative braking by the first motor generator 4 when the consumable electric power is short to the necessary electric power consumption. In this case, engine brake may be worked to make up for a shortage of the braking force. Because the braking force that engine brake takes charge of is part of the necessary braking force, the rise in the engine speed is suppressed.

Other Embodiments

In the above-mentioned embodiments, when the electric compressor 34 is operated to consume electric power, the opening of the bypass valve 42 is adjusted depending on the electric power consumption so as to keep the pressure ratio constant. However, the bypass valve 42 should be opened at least. That is, the bypass valve 42 should be opened to allow the air sent off by the electric compressor 34 to circulate.

From the viewpoint of controllability of the air flow rate after the restart of the engine 2, it is preferable to suppress the pressure ratio low. However, if the pressure ratio is suppressed too low when the target electric power consumption is large, the rotation speed of the electric compressor 34 might reach an upper limit. Thus, the pressure ratio does not necessarily have to be kept constant, but it is preferable that the opening of the bypass valve 42 is adjusted depending on the electric power consumption so that the pressure ratio is kept within a constant range without depending on the electric power consumption.

In the second embodiment, the cooling apparatus 44 may be an air-cooling intercooler. When the cooling apparatus 44 is the air-cooling intercooler, the maximum cooling ability should be calculated from an outside air temperature and a vehicle speed. The maximum cooling ability of the air-cooling intercooler increases as the vehicle speed increases and as the outside air temperature increases.

Also, the above-mentioned embodiments exemplify the hybrid vehicle that comprises two motor generators, which are the first motor generator 4 and the second motor generator 6, and is configured to make one motor generator operate as a generator and make the other motor generator operate as an electric motor. However, the present disclosure can also apply to a hybrid vehicle that is configured to make a single motor generator operate as an electric motor or a generator.

Also, in the above-described embodiment, electric power to operate the electric compressor 34 is supplied from the battery 16 for traveling. However, electric power may be supplied to the electric compressor 34 from a battery (not illustrated) for accessories.

What is claimed is:
1. A hybrid vehicle comprising:
an internal combustion engine that is coupled to a wheel via a power transmission system;
a throttle that is provided on an intake passage of the internal combustion engine;
an electric compressor that is provided on the intake passage upstream of the throttle;

a bypass passage that bypasses the electric compressor;

a bypass valve that is provided on the bypass passage;

a generator that is coupled to the wheel via the power transmission system and is capable of inputting regenerative braking force obtained by electric power regeneration to the power transmission system;

a battery that stores electric power regenerated by the generator; and a control apparatus that is configured to completely close the throttle, open the bypass valve and supply electric power to the electric compressor in a case where remaining battery power of the battery is larger than a reference level when regenerative braking is performed with the generator.

2. The hybrid vehicle according to claim 1, wherein, in response to the remaining battery power of the battery being larger than a reference level when the regenerative braking is performed with the generator, the control apparatus is configured to:

when an inlet temperature of the electric compressor is higher than a reference temperature, make an opening of the bypass valve smaller while being open, in comparison with a case where the inlet temperature is equal to or lower than the reference temperature.

3. The hybrid vehicle according to claim 1, further comprising:

a cooling apparatus that cools air circulating between the electric compressor and the bypass passage.

4. The hybrid vehicle according to claim 1, wherein, when the remaining battery power of the battery is larger than the reference level when the regenerative braking is performed with the generator, the control apparatus is configured to close the throttle, open the bypass valve and supply the electric power to the electric compressor such that air is circulated between the electric compressor and the bypass passage.

5. The hybrid vehicle according to claim 1, wherein the control apparatus determines the reference level based on a water temperature of the internal combustion engine.

* * * * *